United States Patent
Gandel et al.

(10) Patent No.: US 6,313,553 B1
(45) Date of Patent: Nov. 6, 2001

(54) ROTATING ELECTROMAGNETIC ACTUATOR COMPRISING AT LEAST ONE MAGNET EMBEDDED IN FERROMAGNETIC MATERIAL

(75) Inventors: Pierre Gandel, Montfaucon; Christophe Besson, Besancon, both of (FR)

(73) Assignee: Moving Magnet Technologies S.A. (FR)

( * ) Notice: Subject to any disclaimer, the term of this patent is extended or adjusted under 35 U.S.C. 154(b) by 0 days.

(21) Appl. No.: 09/438,425

(22) Filed: Nov. 12, 1999

(30) Foreign Application Priority Data

Nov. 13, 1998 (FR) .................................................. 98 14284

(51) Int. Cl.[7] .............................. H02K 33/00; H02K 1/27
(52) U.S. Cl. ................. 310/36; 310/156.45; 310/156.32; 310/268; 310/254
(58) Field of Search .................................. 310/37, 38, 39, 310/254, 268, 156, 49 R, 36; 318/119

(56) References Cited

U.S. PATENT DOCUMENTS

| 4,510,403 |   | 4/1985 | Vanderlaan et al. ................ 310/37 |
| 4,691,132 | * | 9/1987 | Bertram et al. .................... 310/156 |
| 5,334,893 | * | 8/1994 | Oudet et al. ........................ 310/38 |
| 5,670,836 | * | 9/1997 | Horst ................................. 310/156 |
| 5,942,832 | * | 8/1999 | Oudet ................................ 310/254 |

FOREIGN PATENT DOCUMENTS

| 558362 | 9/1993 | (EP) . |
| 630098 | 12/1994 | (EP) . |
| 2670629 | 6/1992 | (FR) . |
| WO 96/34448 | 10/1996 | (WO) . |

* cited by examiner

*Primary Examiner*—Burton S. Mullins (57) ABSTRACT

A a rotating electromagnetic actuator with limited stroke, including at least 2N poles on the stator, N being a whole number, energized by at least one energizer coil and N magnetized parts on the rotor arranged in an air gap of thickness E wherein each magnetized part is juxtaposed with at least one ferromagnetic part with a thickness e between 0 and E, defining one or two air gaps with a total length of E-e.

11 Claims, 7 Drawing Sheets

ROTATING ELECTROMAGNETIC ACTUATOR COMPRISING AT LEAST ONE MAGNET EMBEDDED IN FERROMAGNETIC MATERIAL

BACKGROUND OF THE INVENTION

1. Field of the Invention

This invention regards the field of single-phase rotating electromagnetic actuators, that is, electromagnetic devices that have a limited stroke, as opposed to engines that have an unlimited stroke. Actuators are designed for precise positioning, with good repeatability, of an associated mechanism, with constant torque throughout the length of the stroke with a simple control law, preferably linear, avoiding the use of complex control circuits.

2. Discussion of the Background

In the current state of the art there are many types of rotating single-phase actuators that comprise a stationary component consisting of a first stator magnetic circuit made of a material with very high magnetic permeability energized by at least one energizer coil and a mobile component consisting of an axially magnetized disk.

For example, American patent U.S. Pat. No. 4,510,403 describes an actuator comprising a thick central magnet. Such actuators do not supply constant torque, and have central position restoring torque.

In general, we know how to eliminate these disadvantages by using thin magnets transversely magnetized in the direction of the smallest dimension, perpendicular to the polar surfaces. This magnetized disk has 2N pairs of magnetic poles magnetized in alternating directions. The magnetization is virtually uniform. The magnetized disk is attached to a second magnetic circuit made of a material with high magnetic permeability. The mobile component is equipped with a coupling shaft designed to transmit the torque.

By way of example, these types of actuators are described in French patent application EP558362 filed by the applicant.

These actuators have constant torque for a given current, and a torque proportional to the current applied to the energizer coil. However, they have one disadvantage concerning their price: they require high energy magnets, Neodymium-Iron-Boron magnets, for example, whose cost price is high.

Additionally, the structures of the prior art use multipolar magnets or assemblies of several magnets in alternating direction, which prohibits magnetizing after assembly and requires handling high energy magnets when the actuators are being assembled. This type of handling is delicate, since high energy magnets can introduce particles, metal shavings, for example, into the actuators when they are positioned on the mobile component. To prevent this disadvantage, we know how to encapsulate the magnets, a costly solution that has the disadvantage of further increasing the cost price of the actuators.

SUMMARY OF THE INVENTION

To eliminate these disadvantages, the invention proposes a high-performance rotating electromagnetic actuator at a lower cost price that comprises at identical torques a smaller magnet mass than those of the prior art. These magnets are preferably all magnetized in the same direction, which permits magnetization subsequent to assembly of the mobile component, and therefore makes it possible to avoid handling high energy magnets likely to introduce metal shavings into the actuator during manufacture. The invention also targets the enhanced performance of the actuators of the prior art, particularly with regard to the torque at the beginning of the stroke and the overall size of the actuator.

In its most general sense, the invention regards a rotating electromagnetic actuator comprising a stationary component consisting of at least a first stator magnetic circuit with at least 2N poles, N being a whole number, energized by at least one energizer coil and a mobile component comprising at least one magnet wherein the mobile component comprises N magnets juxtaposed with at least one ferromagnetic part with a thickness e between 0 and E, defining one or two air gaps, with a total length of E-e.

As a result, the mobile component has a ferromagnetic thickness stairway that creates an effect of variable reluctance that produces a gap at the start of the stroke proportional to the square of the ampere-turns applied to the coils.

Advantageously, the width of one of the magnetized parts $Y_a$ measured along its mean diameter is equal to $$C+S+2E'$$

where C is the width of the angular arc travelled by the rotor on the mean diameter of the magnetized parts, S is the width measured on the mean diameter of the magnetized parts between two adjacent stator poles and E' is between E/2 and E, with $$\frac{C+2E'}{E} > 3$$

and $$\frac{L}{E} > 0.75,$$

preferably $$0.8 \frac{L}{E} < 0.9$$

L designates the thickness of a magnetized part in the direction of magnetization, in order to ensure torque due to the roughly constant current along the length of the stroke and roughly proportional to the current.

According to a preferred variation, the interposed ferromagnetic portions of the mobile part have a thickness e in the direction of magnetization of the magnetized parts with a thickness L, so that: $0<e/L<0.6$.

According to a special mode of embodiment, the stationary component comprises a stator part that has 2N semi-annular polar parts each surrounded by an energizer coil.

According to a first variation, the stationary component comprises a second stator part symmetrical to the first stator part, also having 2N semi-annular polar parts each surrounded by an energizer coil.

According to a second variation, the mobile component is formed by a rotating yoke bearing N magnets magnetized axially and N interposed ferromagnetic parts.

According to another mode of embodiment, the mobile part is tubular in shape and bears N tile-shaped magnets magnetized radially and N interposed ferromagnetic parts. The stationary component has 2N stator poles that are semi-tubular in shape.

According to a preferred variation, the mobile component comprises N magnets magnetized after they are positioned on the mobile component.

According to a preferred mode of embodiment, the mobile component comprises N magnets housed in cavities provided in the yoke of the mobile part, the complementary areas to these cavities forming the interposed ferromagnetic parts.

In the various embodiment variations, the volume of an interposed ferromagnetic part can be equal to the volume of a magnet; however, this is not a necessary constraint but a special case. When the magnet or magnets are housed in a cavity or a groove made in the rotor, the magnet can be level with the surface of the rotor or can be sunk into the rotor or, on the contrary, can extend beyond the surface of the rotor.

When the actuator is not saturated, within the effective stroke the torque may be broken down into three components: magnetostatic torque $C_0$ (without current), often negligible, a period of polarized torque $C_{ni}$ proportional to the ampere-turns, and a period of torque $C_{ni2}$ proportional to the square of the ampere-turns, due to the variable reluctance created by the interposed ferromagnetic parts with a thickness e:

$$C=C_0+C_{ni}+C_{ni2}$$

Without interspersed ferromagnetic parts, e=0, $C_{ni2}$=0.

For a given ampere-turns value, the three torque periods increase when the thickness e of the interposed ferromagnetic parts increases.

For slight thicknesses e of interposed ferromagnetic parts and/or for low values of ampere-turns, the actuator has a torque virtually proportional to the current and virtually constant along the length of the stroke ($C_{ni2}$ is negligible). On the other hand, the torque is increased in the case without any interposed ferromagnetic parts (e=0).

For significant thicknesses of interposed ferromagnetic parts, the torque is significantly increased, but when the ampere-turns become significant, the torque is no longer proportional to the current. Its course is no longer constant along the length of the stroke due to the variable reluctance created by the interposed ferromagnetic parts, which is not problematic in certain applications and may sometimes be exploited.

When a torque peak from 2 to 3 times the nominal torque is necessary along the entire stroke, it is necessary to limit the ratio e/L where e is the thickness of a ferromagnetic part and L is the length of a magnet in the direction of magnetization, so as not to saturate the coil core at the end of the stroke by excess inductance. An e/L ratio<0.6 is then desirable.

The thickness of the interposed ferromagnetic parts is then chosen judiciously through an appropriate calculation, in order to adapt and optimize the torque supplied by the actuator for a given application.

BRIEF DESCRIPTION OF THE FIGURES

Figure 1:
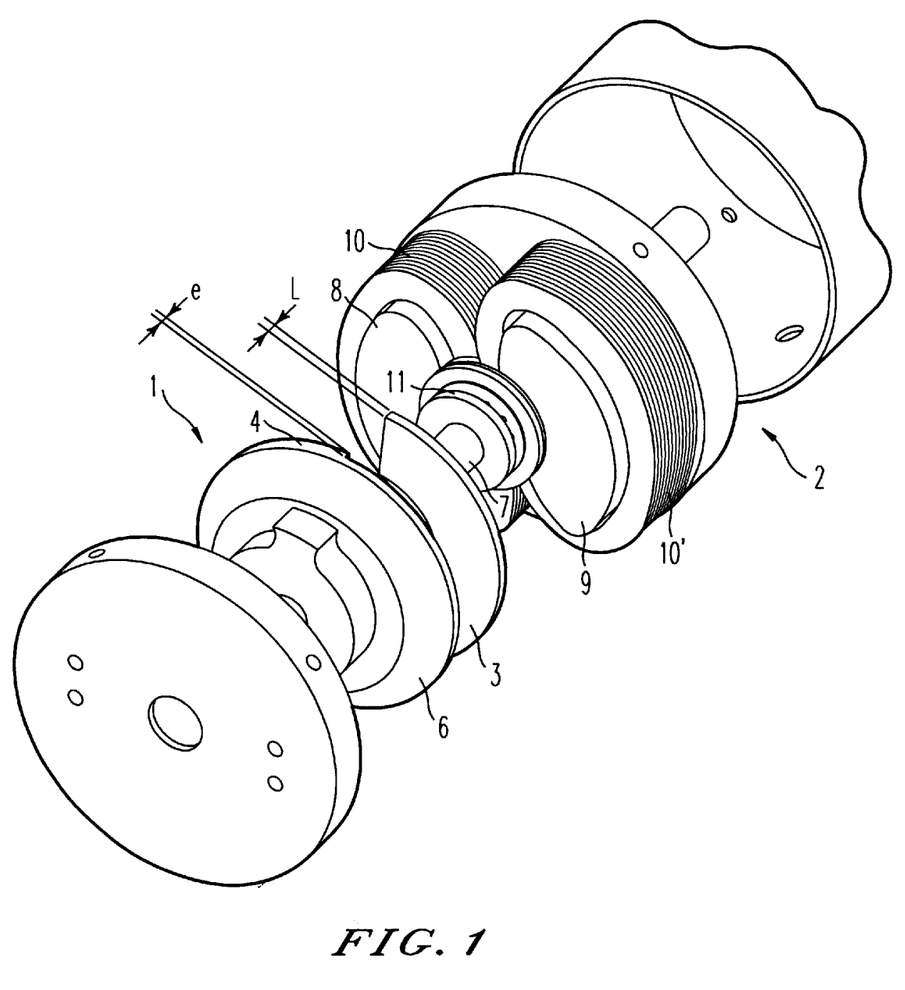
FIG. 1 is a cutaway view of a rotating actuator according to the invention.
Figure 2:
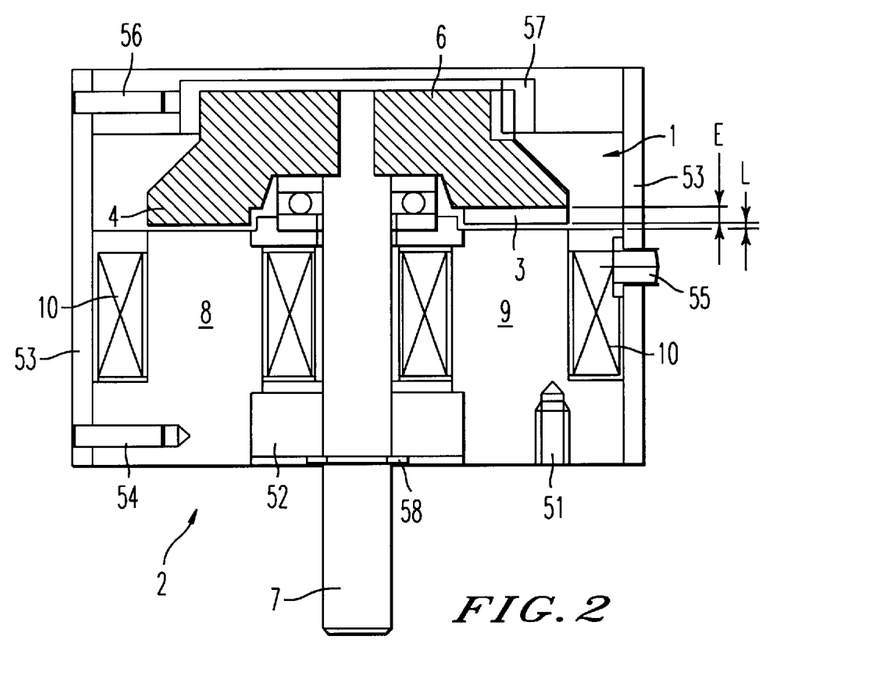
FIGS. 2 and 3 respectively show axial and cross sections of said actuator.
Figure 3:
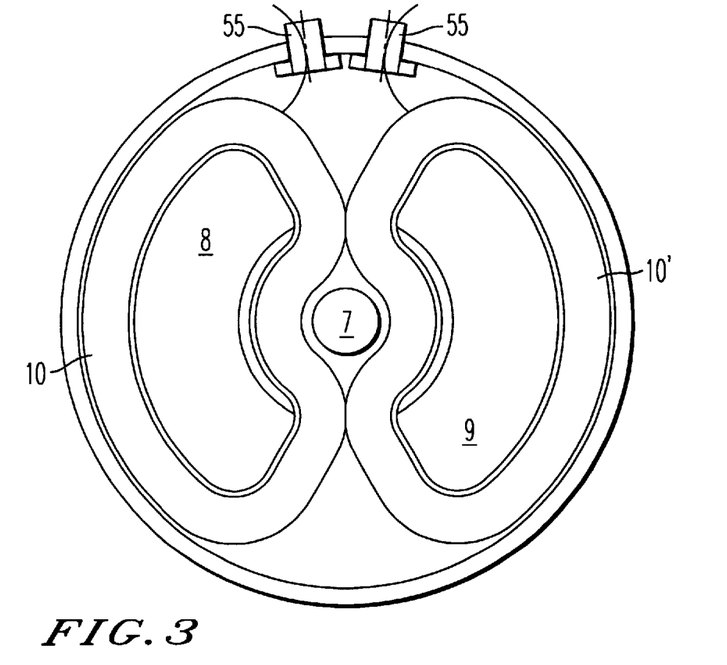

The invention will be better understood by reading the following description given in reference to the appended drawings concerning non-restrictive examples of embodiment where:

FIGS. 1 to 3 show a rotating actuator according to a first mode of embodiment of this invention in cutaway view, as an axial section and as a cross section respectively.

DESCRIPTION OF THE PREFERRED EMBODIMENTS

The actuator consists of a mobile component (1) and a stationary component (2). The mobile component comprises a flat magnet (3) shaped like a half disk magnetized in the direction of the thickness and extending over 180° when one seeks the maximum stroke. When a shorter stroke is considered satisfactory, this angle can be reduced to approximately 150° to 160°. It can be made using different methods known in the state of the art, for example by magnetizing a disk made of Neodymium-Iron-Boron using a magnetization head, preferably after assembly of the mobile component. The part complementary to the magnet is made up of a ferromagnetic part (4) whose thickness e is determined in order to optimize the torque.

The magnet (3) is glued in the mode of embodiment described onto a mobile rotor circuit (6) forming one piece with the coupling shaft (7). The stationary stator part (2) and the mobile rotor part (6) can be made of soft machined, sintered and/or cast iron or even using an iron-nickel alloy.

The stationary component (2) includes two poles (8, 9) surrounded by coils (10, 10') coiled with connecting turns. The two coils (10) and (10') respectively surround the two polar parts (8) and (9), avoiding the passage channel of the axis (7).

The dimensions of the stationary magnetic circuit (2) and of the mobile magnetic circuit (6) are determined in known fashion so as to allow the passage of all the magnetic flux in play for the stationary ampere-turns, considering the temperature conditions, without saturation.

The link between the mobile part (1) and the stationary part (2) is produced by a ball bearing (11) defining the air gap. The external diameter of the ball bearing is roughly equal to the internal diameter of the bore of the magnet in order to properly absorb the stresses on the axis (7).

The coupling shaft (7) goes through the stationary component (2). The mobile rotor part (6) is conical in shape in order to reduce the inertia of the mobile component, while allowing satisfactory passage of the magnetic flux. The actuator according to this variation allows fixation through the intermediary of tapped fixation holes (51) provided in the mass of the stator part (2). A block (52) limits the lateral clearance of the axis (7). The actuator is mounted in a housing (53) made of molded plastic material or non-magnetic or only slightly magnetic metal. A pin (54) immobilizes the stationary stator part (2) with respect to said housing (53). A lateral orifice (55) allows passage of the supply leads of the electrical coils (10). The cover (56) of the housing (53) has a stop (57) limiting the angle of rotation of the rotor (1). A circlip mounted on the axis (7) limits the amplitude of the axial play and prevents a force from being applied too abruptly to the end of the axis, thereby causing damage to the mobile component or to the cover. This circlip is, however, not intended to position the mobile component (6) axially with respect to the stator part (2). This positioning is essentially accomplished by the magnetic phenomena.

Figure 4:
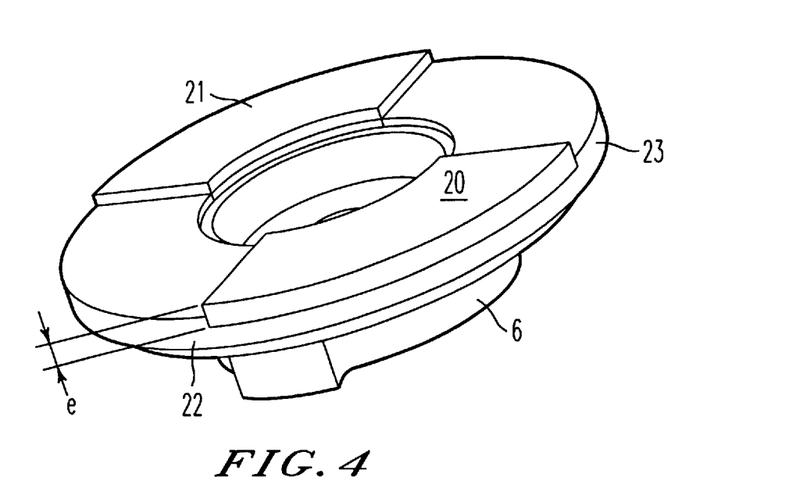
FIG. 4 is a view of a variation of embodiment of the mobile component.

FIG. 4 shows a three-quarter front view of the rotor according to a variation of the invention with N=2. The rotor has two magnets (20, 21), magnetized axially, in the same direction. The two magnets are diametrically opposed to each other. Between the two magnets (20, 21), the mobile component comprises interposed ferromagnetic parts (22, 23) whose thickness is chosen in order to optimize the torque. These interposed ferromagnetic parts may be made up of gussets glued to the yoke (6). Preferably, they are formed by the protruding parts of the yoke (6) having cavities for housing the magnets (20, 21).

Figure 5:
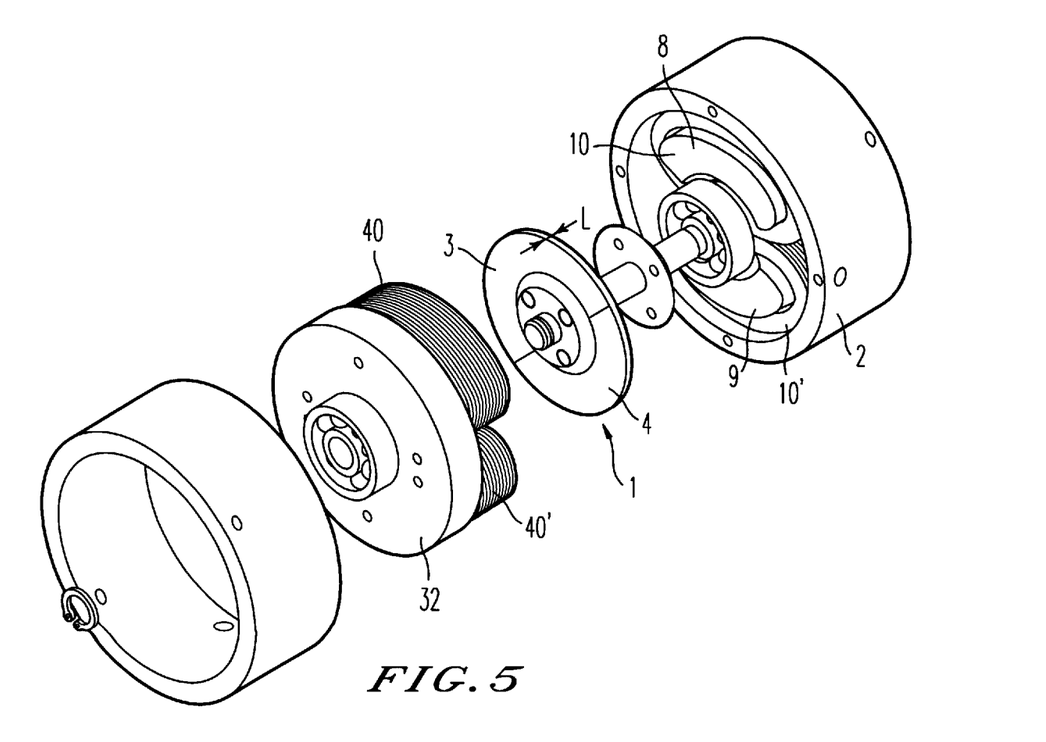
FIG. 5 is a view of a symmetrical actuator with two stators.

FIG. 5 shows a view of a symmetrical actuator with two stators. The actuator comprises a first stator circuit (2) and a second stator circuit (32) aged symmetrically with respect to the mobile component (1). Each of the stator circuits (2, 32) comprises two stator poles (8, 9). The stator poles of the second circuit are not visible in FIG. 5. The stator poles are surrounded by coils (10, 10', 40, 40'). The mobile component (1) is composed of a magnetized part (3) and a ferromagnetic part (4).

Figure 6:
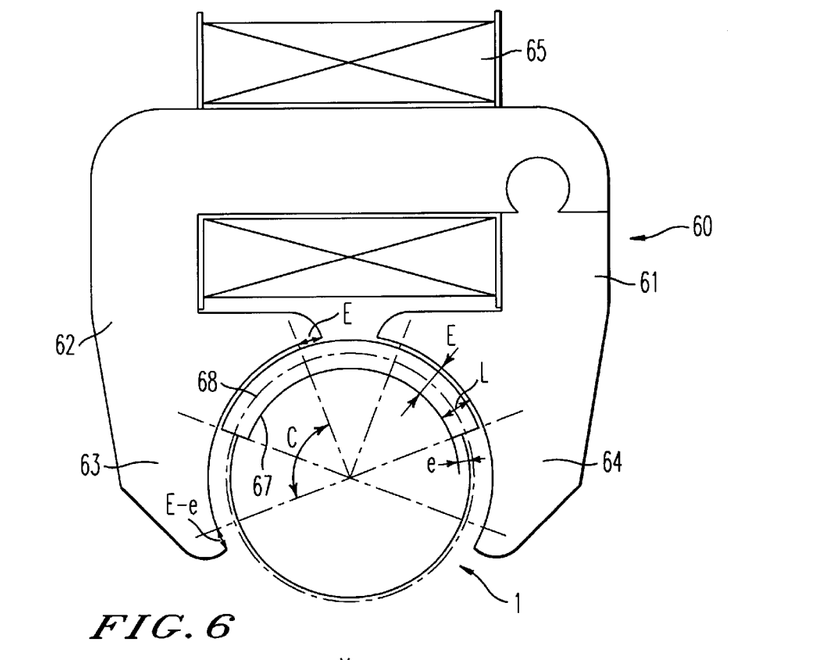
FIG. 6 is a tubular variation of embodiment.

FIG. 6 represents a variation of embodiment of a tubular actuator. The stationary part is formed by a stator (60) with a horseshoe-shaped transversal section, each end (61, 62) being extended by a tile-shaped stator pole (63, 64). The stator is energized by a coil (65). The rotor (1) is made up of a part made of soft iron that is cylindrical in shape, with a groove (67) in which is housed a magnet (68) in the shape of a semi-cylindrical tile.

Figure 7:
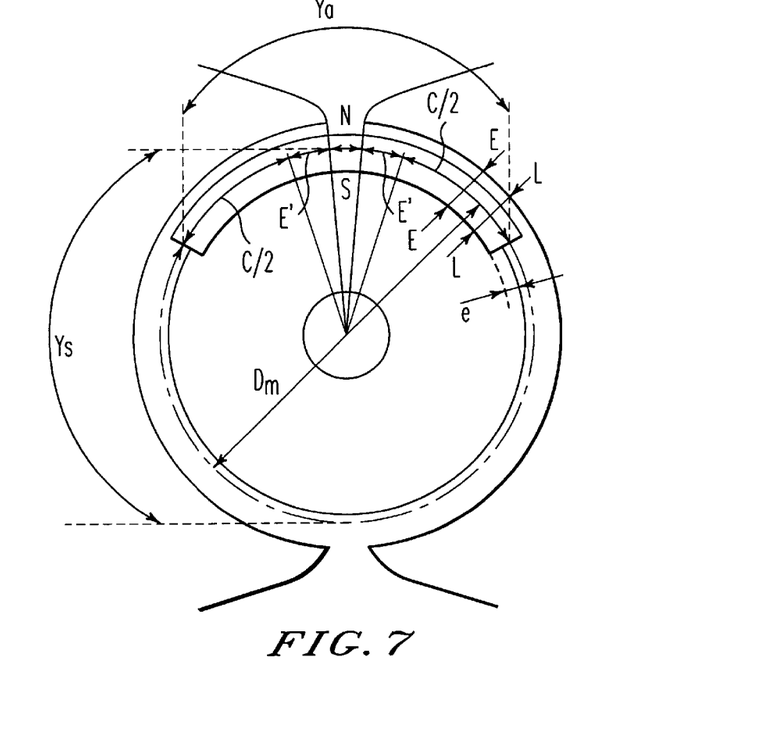
FIG. 7 is a schematic view showing the various dimensions.

FIG. 7 shows the different dimensions. The magnetized part, with a width $Y_a$, is positioned in an air gap E and juxtaposed with a ferromagnetic part with a thickness e defining a second air gap with a length E-e. The stroke C is the width of the angular arc travelled by the rotor on the mean diameter $D_m$ of the magnetized part. S is the width measured on the mean diameter of the magnets between two adjacent stator poles. L is the thickness of a magnetized part in the direction of magnetization.

Figure 8:
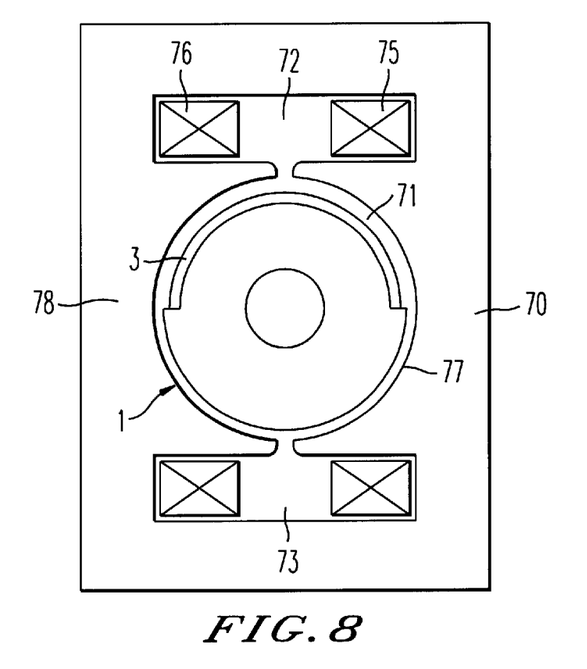
FIGS. 8 to 12 are variations of embodiment.

FIG. 8 represents a variation of embodiment of a tubular rotating actuator. The stator is formed by a frame (70) with a central cylindrical cavity (71) to receive the cylindrically-shaped rotor (1) and two roughly rectangular cavities (72, 73) to receive two coils (75, 76) that energize the stator poles (77, 78) that are semi-cylindrical in shape. The rotor has a groove that extends over approximately 180° to receive a magnet (3) magnetized radially, shaped like a tile.

Figure 9:
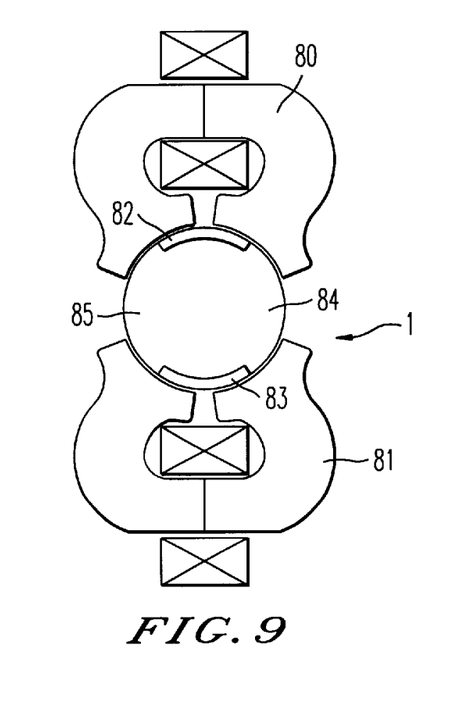

FIG. 9 represents a variation of embodiment of a tubular actuator comprising two stator circuits (80, 81) whose section is shaped like a horseshoe, as in the variation represented in FIG. 6, for a single stator circuit. The mobile component (1) is shaped like a cylinder and bas two grooves for housing magnets (82, 83), magnetized radially, preferably in the same direction. The protruding parts (84, 85) interposed between these grooves form the interposed parts of soft iron.

Figure 10:
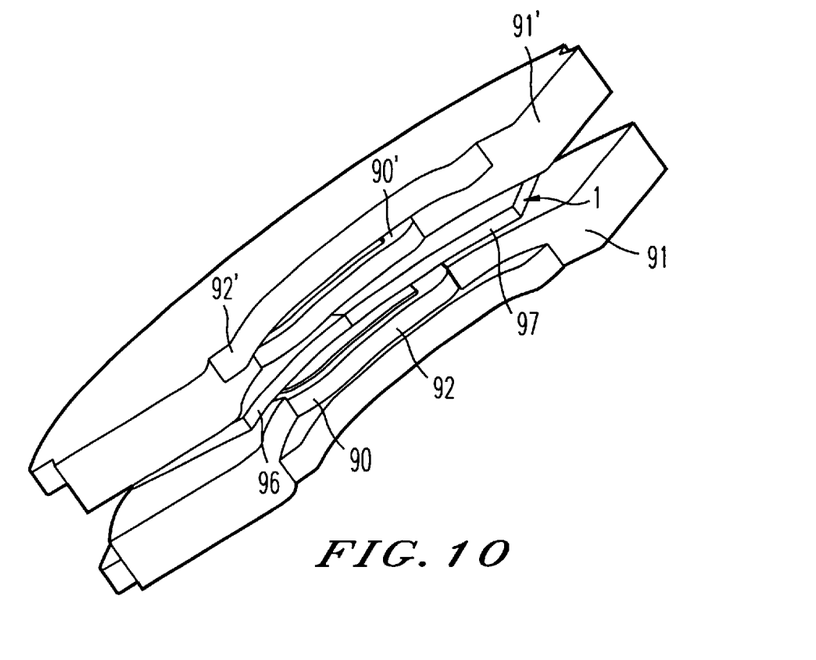

FIG. 10 is a partial view of a variation of embodiment in which the rotor (1) is composed of a magnetized part (96) and a ferromagnetic part (97) placed between two symmetrical annular structures (91, 91') each having a housing (90, 90') to receive a flat coil (92, 92').

Figure 11:
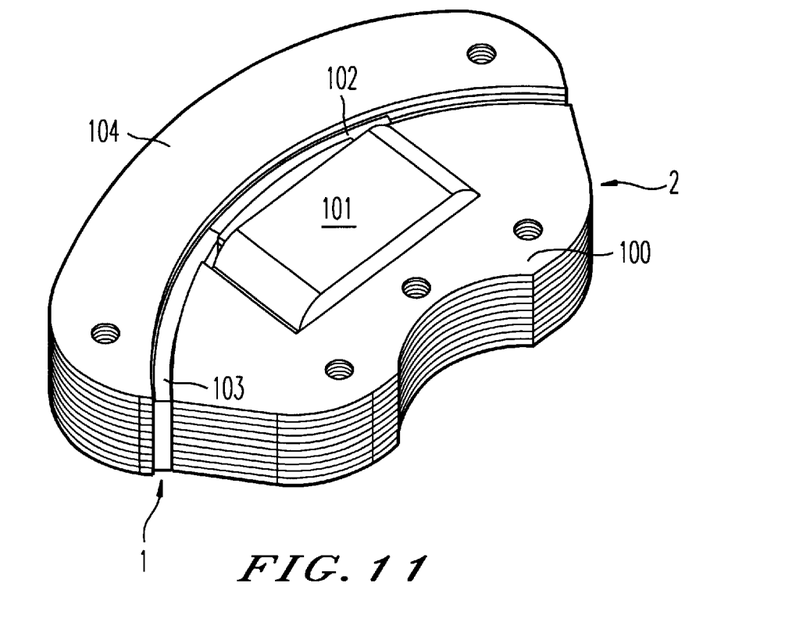

FIG. 11 is a partial view of a tubular variation of embodiment in which the stator circuit (2) is formed by a ferromagnetic structure (100) with a housing to receive a coil (101). The rotor (1), composed of a magnetized part (102) and a ferromagnetic part (103), is placed between this annular structure (100) and a yoke (104) that is also annular in shape.

Figure 12:
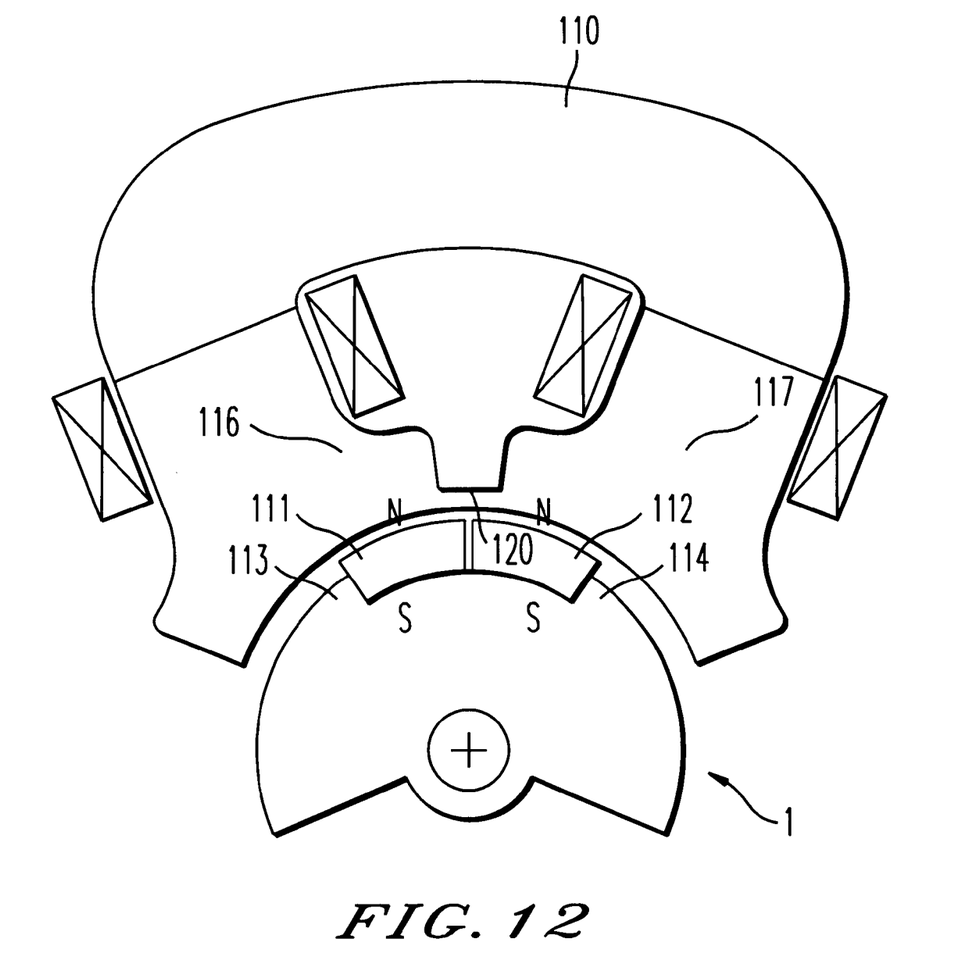

FIG. 12 is a variation of embodiment of a tubular actuator comprising a stator circuit (110), whose section is shaped like a horseshoe. The mobile component (1) is shaped like a portion of a cylinder and has a groove for housing magnets placed side by side (111, 112) magnetized radially in the same direction. The protruding parts (113, 114) juxtaposed with this groove form the interposed parts of soft iron. The stator poles (116, 117) are connected by a thin, saturable ferromagnetic piece (120) in order to attenuate the effect of the transition of the magnets on the characteristic of the torque.

What is claimed is:

1. A rotating electromagnetic actuator with limited stroke, comprising at least 2N poles on the stator, N being a whole number, energized by at least one energizer coil and N magnetized parts of thickness L in a direction of polarization, on the rotor arranged in an air gap of thickness E in the direction of polarization of the magnetized poles, wherein each magnetized part is juxtaposed with at least one ferromagnetic part with a thickness e in the direction of polarization, comprised between 0 and E, defining one or two air gaps with a total length of E-e in the direction of the magnetized part.

2. A rotating electromagnetic actuator as claimed in claim 1, preferably single-phase, wherein the circumferential width of one of the magnetized parts $Y_a$ measured on its mean diameter is equal to

C+S+2E' where C is the circumferential width of the angular arc traveled by the rotor on the mean diameter of the magnetized parts, S is the circumferential width measured on the mean diameter of the magnetized parts between two adjacent stator poles, E' is between E/2 and E, with $$\frac{C+2E'}{E} > 3$$

and $$\frac{L}{E} > 0.75,$$

preferably $$0.8 < \frac{L}{E} < 0.9$$

L designates the thickness of the magnetized part in the direction of magnetization, in order to ensure a torque due to the current roughly constant along the length of the stroke and roughly proportional to the current.

3. A rotating electromagnetic actuator as claimed in claim 1, wherein the interposed ferromagnetic parts of the rotor have a thickness e in the direction of magnetization of the magnetized parts of thickness L, so that: 0<e/L<0.6.

4. A rotating electromagnetic actuator as claimed in claim 1, wherein the N magnetized parts are composed of several juxtaposed magnets.

5. A rotating electromagnetic actuator as claimed in claim 1, wherein the stationary component comprises a stator part with 2N polar parts shaped like a tubular sector, each surrounded by an energizer coil.

6. A rotating electromagnetic actuator as claimed in claim 1, wherein the stationary component comprises a second stator part symmetrical to the first stator part, also with 2N semi-annular polar parts each surrounded by an energizer coil.

7. A rotating electromagnetic actuator as claimed in claim 1, wherein the rotor is formed by a rotating yoke bearing N magnetized parts, magnetized axially, and N interposed ferromagnetic parts.

8. A rotating electromagnetic actuator as claimed in claim 1, wherein the rotor is semi-tubular in shape and bears N magnetized parts shaped like tiles, magnetized radially, and at least one interposed ferromagnetic part, and wherein the stationary component has 2N stator poles of semi-tubular shape.

9. A rotating electromagnetic actuator as claimed in claim 1, wherein the rotor comprises N magnetized parts magnetized after being positioned on the rotor.

10. A rotating electromagnetic actuator as claimed in claim 1, wherein the rotor comprises N magnetized parts housed in cavities provided in a yoke of the rotor, areas complementary to these cavities forming the interposed ferromagnetic parts.

11. A rotating electromagnetic actuator as claimed in claim 1, wherein the 2N poles of the stator are connected between them by saturable ferromagnetic isthmuses.

* * * * *